United States Patent [19]

Kuroyanagi

[11] Patent Number: 4,586,083
[45] Date of Patent: Apr. 29, 1986

[54] GHOST REDUCTION CIRCUIT ARRANGEMENT FOR A TELEVISION RECEIVER

[75] Inventor: Tomomitsu Kuroyanagi, Yokohama, Japan

[73] Assignee: Hitachi, Ltd., Tokyo, Japan

[21] Appl. No.: 331,280

[22] Filed: Dec. 16, 1981

[30] Foreign Application Priority Data

Dec. 22, 1980 [JP] Japan .................. 55-180378

[51] Int. Cl.[4] ..................................... H04N 5/213
[52] U.S. Cl. .................................................. 358/167
[58] Field of Search ......................................... 340/167

[56] References Cited

U.S. PATENT DOCUMENTS 4,053,932 10/1977 Yamaguti et al. ............... 358/167
4,127,874 11/1978 Iwasawa et al. ................. 358/167

Primary Examiner—James J. Groody
Attorney, Agent, or Firm—Antonelli, Terry & Wands

[57] ABSTRACT

The output signals from the first set of delay elements of m each with a first delay time are selectively applied to a second set of delay elements of n each with a second delay time by means of a switch. The output signals from the said first and said second of delay elements are processed by the individual gain controllable circuits and are composed by an adder. The gains of the gain controllable circuits are respectively controlled by output signals from the control voltage generating circuits which are set by the output signals from comparators for comparing the television signal supplied to the input terminal with a reference signal from the reference signal generating circuit, so that the ghost interference in the television receiver can be reduced by a lesser number of delay elements by subtracting the output signals of the adder circuits from the television input signal in subtractor circuits.

3 Claims, 7 Drawing Figures

F I G. 6
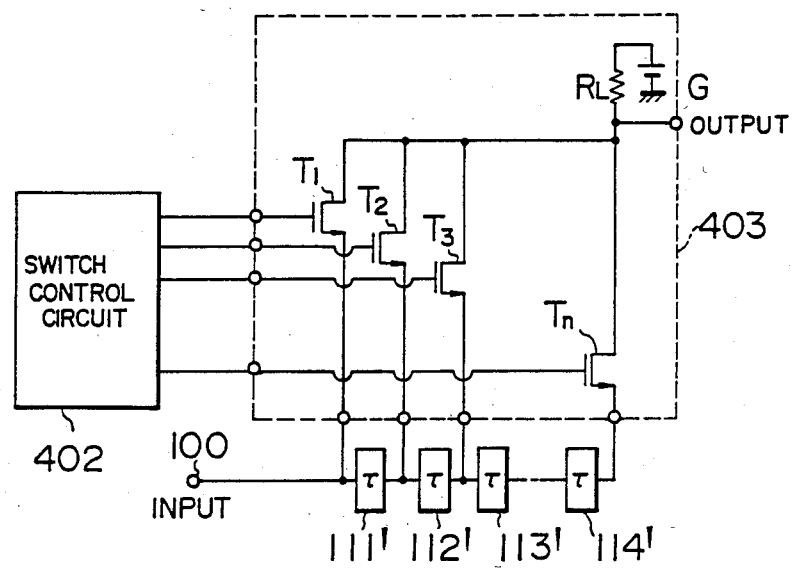
F I G. 7
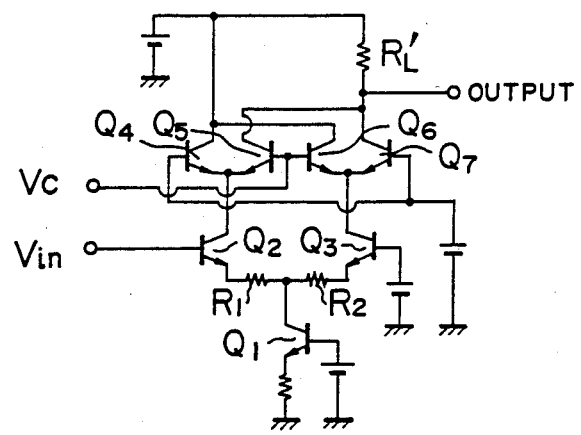

GHOST REDUCTION CIRCUIT ARRANGEMENT FOR A TELEVISION RECEIVER

The present invention relates to a television receiver, and more particularly to a ghost reduction circuit arrangement for alleviating ghost interference in a television receiver.

A television receiver with a ghost reduction circuit using a so-called transversal filter, which waveform-equalizes a video signal in order to reduce the ghost interference in a television broadcasting system, has recently been disclosed in some articles such as 1979 National Convention Record of the Institute of Television Engineers of Japan, P349, and Japanese Patent Application Kokai (Laid-Open) No. 108,521/79.

Other objects, features and advantages of the present invention will become apparent from the following description of preferred embodiment thereof taken in connection with the accompanying drawings, in which:

FIG. 6 is a circuit diagram for illustrating an embodiment of a delay signal selector switch shown in FIG. 4; and FIG. 7 is a circuit diagram for illustrating an embodiment of a gain control circuit.

According to the present invention, there is provided a ghost reduction circuit arrangement for a television receiver comprising: a first set of delay elements or m each with a first delay time, a first set of gain control circuits of m to which output signals from the first set of delay elements are applied, correspondingly and respectively; a first control voltage generating circuit which compares a television signal containing a ghost signal applied to the input terminals of the first set of delay elements with a reference signal, thereby to produce a signal for controlling a gain of each of the first set of gain control circuits on the basis of the result of the comparison; a first adder for adding the output signals from the first set of gain control circuits; a first subtracting circuit for subtracting the output signal from the first adder circuit from the input television signal; a second set of delay elements of n each with a second delay time; a second set of gain control circuits of n to which the output signals from the second set of delay elements are applied, correspondingly and respectively; means for selectively supplying the output signal from at least one of the first set of delay elements to an input terminal of the second set of delay elements; a second control voltage generating circuit which compares the output signal from the first subtracting circuit with the reference signal to produce a signal for controlling a gain of the second set of gain control circuits on the basis of the result of the comparison; a second adder for adding the output signals from the second set of the control circuits; and a second subtracting circuit for subtracting the output signal of the second adder circuit from the output signal of the first subtracting circuit.

Figure 1:
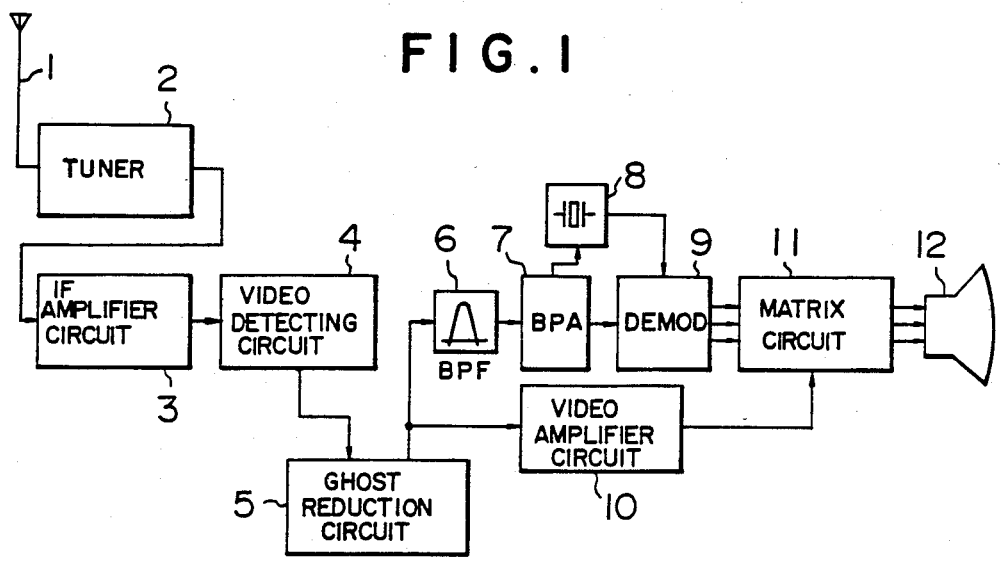
FIG. 1 is a block diagram for illustrating a television receiver containing a ghost reduction circuit.

FIG. 1 is a block diagram of a television receiver with a ghost reduction circuit. In the figure, reference numeral 1 designates an antenna; 2 a tuner; 3 an IF amplifier circuit; 4 a video detector circuit; 5 a ghost reduction circuit; 6 a band-pass filter; 7 a band-pass amplifier circuit; 8 a color sync circuit; 9 a color demodulating circuit; 10 a video amplifier circuit; 11 a matrix circuit; 12 a picture tube.

A television signal received by the tuner 2 is converted into a video signal through the IF amplifier circuit 3 and the video detecting circuit 4, and the converted one is inputted into the ghost reduction circuit 5. The ghost reduction circuit 5 produces a video signal output from which the ghost signal is removed, as will be described later referring to FIG. 2.

A carrier color signal is separated from the video signal of the ghost reduction circuit 5 through the band-pass filter. A color difference signal is reproduced by the combination of the band-pass amplifier circuit 7, the color sync circuit 8 and the color demodulator circuit 9. The reproduced color difference signal and a luminance signal from the video amplifier circuit 10 are processed in the matrix circuit 11, and then supplied to the picture tube 12.

Figure 2:
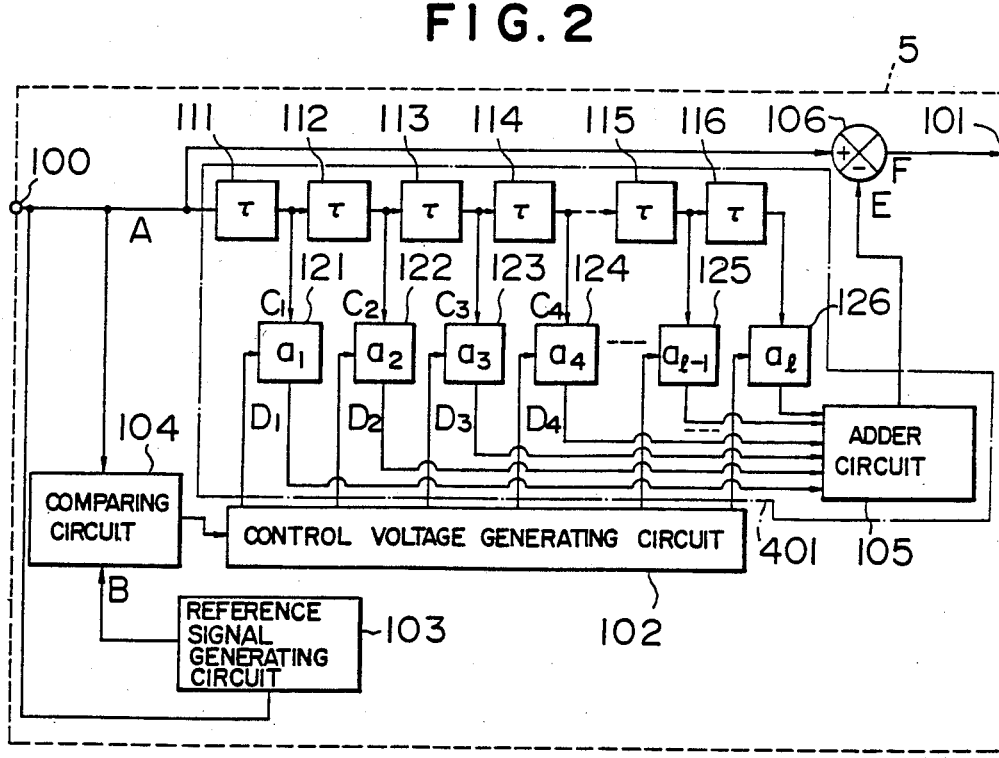
FIG. 2 is a block diagram of a prior art of the ghost reduction circuit arrangement.

FIG. 2 is a block diagram for illustrating a prior ghost reduction circuit arrangement. Reference numeral 100 designates an input terminal for a video signal; 101 an output terminal for the video signal; 111 to 116 delay elements each with a delay time r; 121 to 126 gain controllable circuits; 102 a control voltage generating circuit; 103 a reference signal generating circuit; 104 a comparing circuit; 105 an adder circuit; 106 a subtractor circuit. A transversal filter 401 is comprised of the delay elements, the gain controllable circuits and the adder circuit.

The principle of the operation of the circuit shown in FIG. 2 will be described.

In FIG. 2, a video signal suffering from ghost interference is applied to the input terminal 100. In the transversal filter 401, video signals taken out from the output terminals of the delay elements 111 to 116 are respectively applied to the gain controllable circuits, where those are controlled in their amplitudes and polarities in accordance with a control voltage of the control voltage generating circuit 102. Then, those signals are applied to the adder circuit 105 where those are added to one another.

The comparing circuit 104 detects a ghost signal by using the output signal from the reference signal generator circuit 103, and the video signal subjected to ghost inteference fed from the input terminal 100. The control voltage generating circuit 102 receives the ghost signal and produces a control signal so that the output signal from the transversal filter 401, or the output signal from the adder circuit 105, is made approximate to the ghost signal, thereby to control a frequency characteristic of the transversal filter 401.

With such an arrangement, the output signals from the adder circuit 105 and the video signal from the video signal input terminal are subjected to a subtracting operation in the subtractor circuit 106. Through this process, the video signal with no ghost signal appears at the video signal output terminal 101.

If assuming that the video signal at the input terminal 100 at time $t_o$ is $x_o$, the direct wave signal $v_o$ and the ghost signal $g_o$, these are expressed by $$x_o = v_o + g_o$$

Accordingly, the video signal $y_o$ at the video signal output terminal 101 is given $$y_o = x_o - \sum_{p=1}^{l} a_p \cdot x_{o-p}$$
$$= v_o + g_o - \sum_{p=1}^{l} a_p \cdot x_{o-p}$$

where the number of the delay elements is l, gains of the gain controllable circuits are $a_1, a_2, \ldots a_l$ and the output signal of the p-th delay element is $x_{o-p}$. As seen from the above equation, if the gains $a_1, a_2, \ldots a_l$ of the gain controllable circuits 121 to 126 are so controlled that $$g_o = \sum_{p=1}^{l} a_p \cdot x_{o-p},$$

$y_o = v_o$ holds and the ghost signal may be removed.

Figure 3:
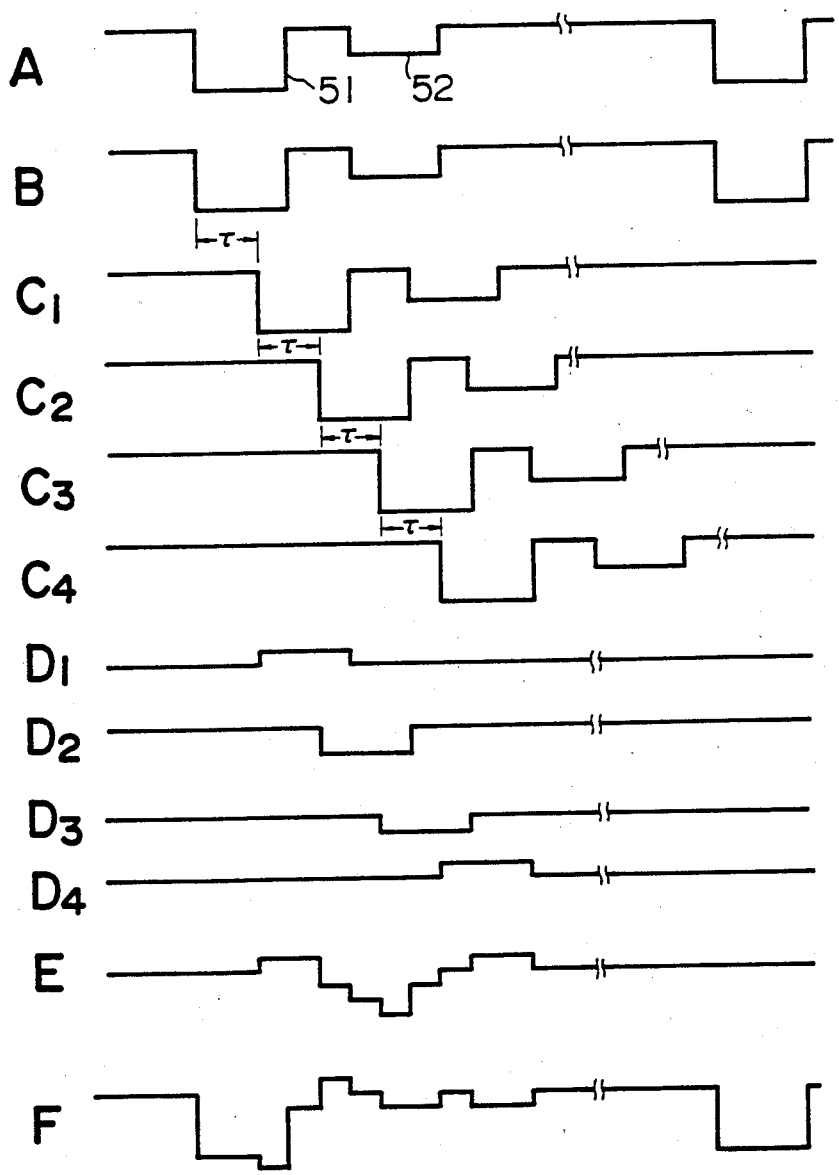
FIG. 3 shows a set of waveforms useful in explaining the operation of the ghost reduction circuit shown in FIG. 2.

In FIG. 3, A to F denote waveforms at the respective portions in the circuit.

A denotes a waveform of a video signal at the input terminal 100, containing a horizontal sync signal 51 and its ghost signal 52. Although only one ghost signal is contained in the sync signal in the case of FIG. 3, a plurality of ghost signal may also be contained actually.

B denotes a waveform of a reference signal which normally uses a signal during the vertical flyback period with no video signal. $C_1$ to $C_4$ are waveforms formed by delaying the signal A by four stages of delay elements 111 to 114. Delay times of the delay elements each are equal to $\tau$.

$D_1$ to $D_4$ are waveforms of the output signals from the gain controllable circuits 121 to 124, when the gains $a_1$ to $a_4$ are
$a_1 = -\frac{1}{4}$
$a_2 = \frac{1}{2}$
$a_3 = \frac{1}{4}$
$a_4 = -\frac{1}{4}$ E is a waveform of an output signal from the transversal filter 401. That is, the waveform E represents that of the output signal from the adder circuit 105 for adding the output signals with the waveforms $D_1$ to $D_4$. F represents a waveform formed by subtracting the waveform E produced by the adder circuit 105 from the waveform A, and the amplitude of the ghost signal 52 is decreased, as seen from the drawing.

In the prior art, a time position (or delay time) where the ghost signal is produced is long. Further, when a plurality of complicated ghost waveforms are produced, the number of the delay elements shown in FIG. 2 must be increased by one and the delay time of each stage of the delay elements must be small.

For removing the ghost occurring at the time position (approximately 10 $\mu$S) which corresponds to about $\frac{1}{4}$ of the television screen, a delay time for each delay element is given according to the sampling theorem, when the frequency band of the video signal is 4.5 MHz, $$\tau = \frac{1}{4.5 \text{ MHz} \times 2} = 100 \text{ nS}$$

Therefore, the number of the delay element stages is $l = 10 \ \mu S/100 \ nS = 100$ stages. The use of the great number of the delay elements hinders the realization of television receivers with the ghost reduction circuit.

Accordingly, an object of the present invention is to provide a ghost reduction circuit for a television receiver with the ghost reduction function comparable with the prior art one, in which the number of the delay elements in question is half-reduced.

To achieve the above object, a ghost reduction circuit arrangement according to the present invention comprises a first transversal filter made up of a plurality of delay elements each with relatively long delay time, and a second transversal filter made up of a plurality of delay elements each with a relatively short delay time, which receives a signal formed by selecting and composing at least one output signal from the plurality of delay elements forming the first transversal filter.

Figure 4:
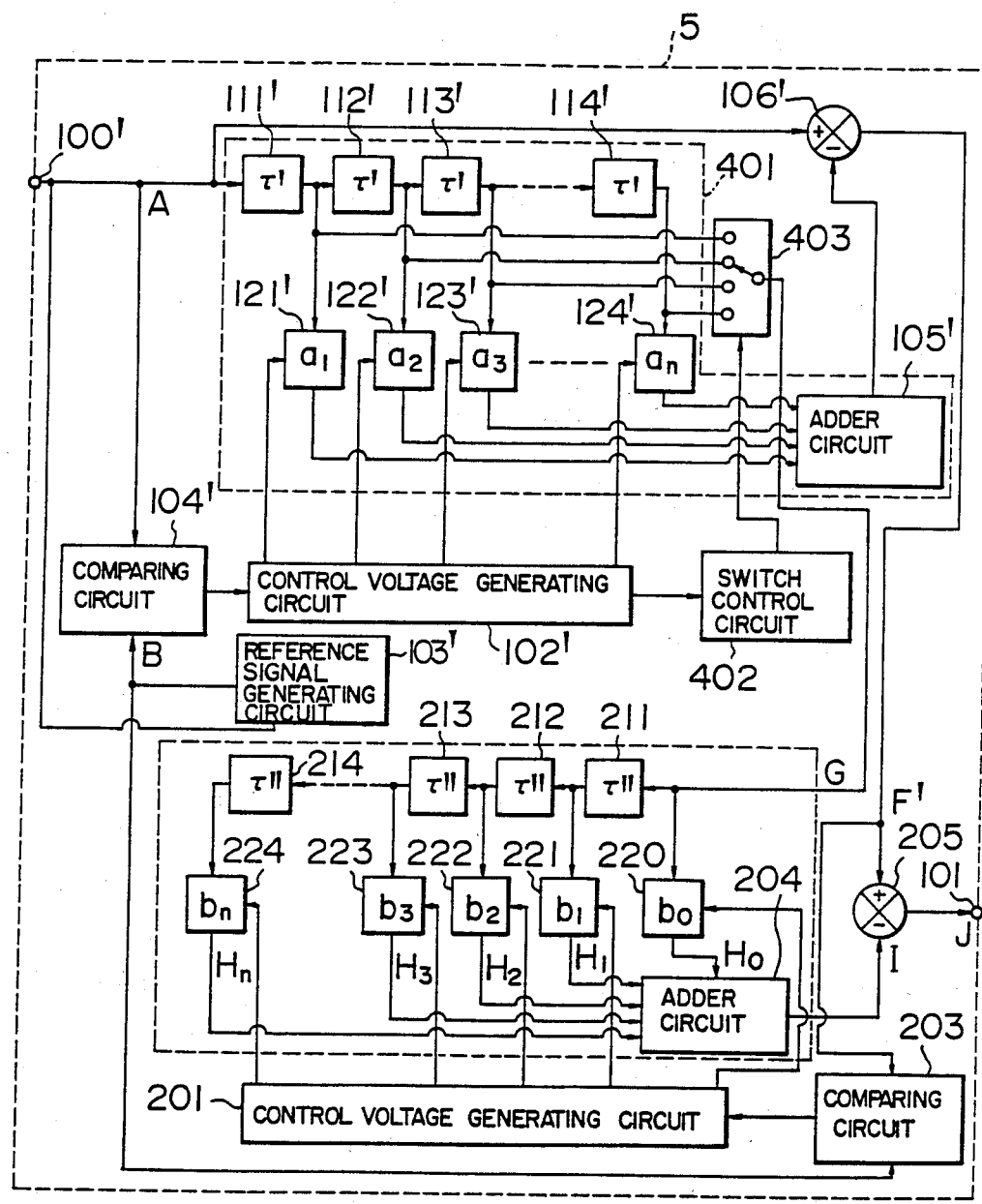
FIG. 4 is a block diagram of an embodiment of a ghost reduction circuit according to the present invention.

An embodiment of a ghost reduction circuit arrangement according to the present invention will be described referring to FIG. 4. In FIG. 4, like primed numerals are used for designating like functional blocks in FIG. 2.

Reference numeral 402 designates a switch control circuit; 403 a delay signal selection switch; 404 a second transversal filter. Reference numerals 111' to 114' a first set of delay elements each with a delay time $\tau'$; 211 to 214 a second set of delay elements each with a delay time $\tau''$; 220 to 224 a second set of gain controllable circuits; 204 a second adder circuit. Those components make up a second transversal filter 404. 201 designates a second control voltage generating circuit; 203 a second comparing circuit; and 205 a second subtraction circuit.

Unlike the embodiment shown in FIG. 2, the present embodiment shown in FIG. 4 additionally employs a delay signal selection switch 403 for selecting one of the output signals from the delay elements (111' to 114') making up the first transversal filter 401, a second transversal filter 404 made up of a second set of delay elements 211 to 214, second gain controllable circuits 220 to 224, and a second adder circuit 204, a second control voltage generating circuit 201, and a second comparator 203.

In FIG. 4, the operations of the first transversal filter 401 and the second transversal filter 404 are basically similar to those of the prior art shown in FIG. 2, although the delay time $\tau'$ of each of the first set of the delay elements 111' to 114' forming the first transversal filter 401 is longer than that of the prior art.

When the delay time $\tau'$ is selected at 250 nS, for example, the frequency band $f_v$ of the ghost signal removable by the first transversal filter 401 is given according to the sampling theorem, $$f_v < \frac{1}{250 \text{ nS}} \times \frac{1}{2}$$
$$< 2 \text{ MHz}$$

Accordingly, in the output signal from the first subtractor circuit 106' which makes a subtraction operation of the output signal from the first transversal filter 401 and the input video signal, the high frequency components at 2 MHz or more of the ghost interference components are incompletely removed, whereas only the low frequency components of the ghost signal are removed.

The delay time $\tau''$ of each of the second set delay elements 211 to 214 of the second transversal filter 404, which is provided in addition to the first transversal filter 401, is 100 nS, for example, as in the prior art. In this case, the frequency band f'$_v$ of the removable ghost signal is $$f'_v < \frac{2}{100 \text{ nS}} \times \frac{1}{2}$$

$$< 5 \text{ MHz}$$

Accordingly, the output signal formed by subtracting the output signal of the transversal filter 404, i.e. the output signal of the second adder circuit 204, from the output signal of the first subtractor circuit 106', becomes a video signal of which the ghost signals are almost perfectly removed.

Figure 5:
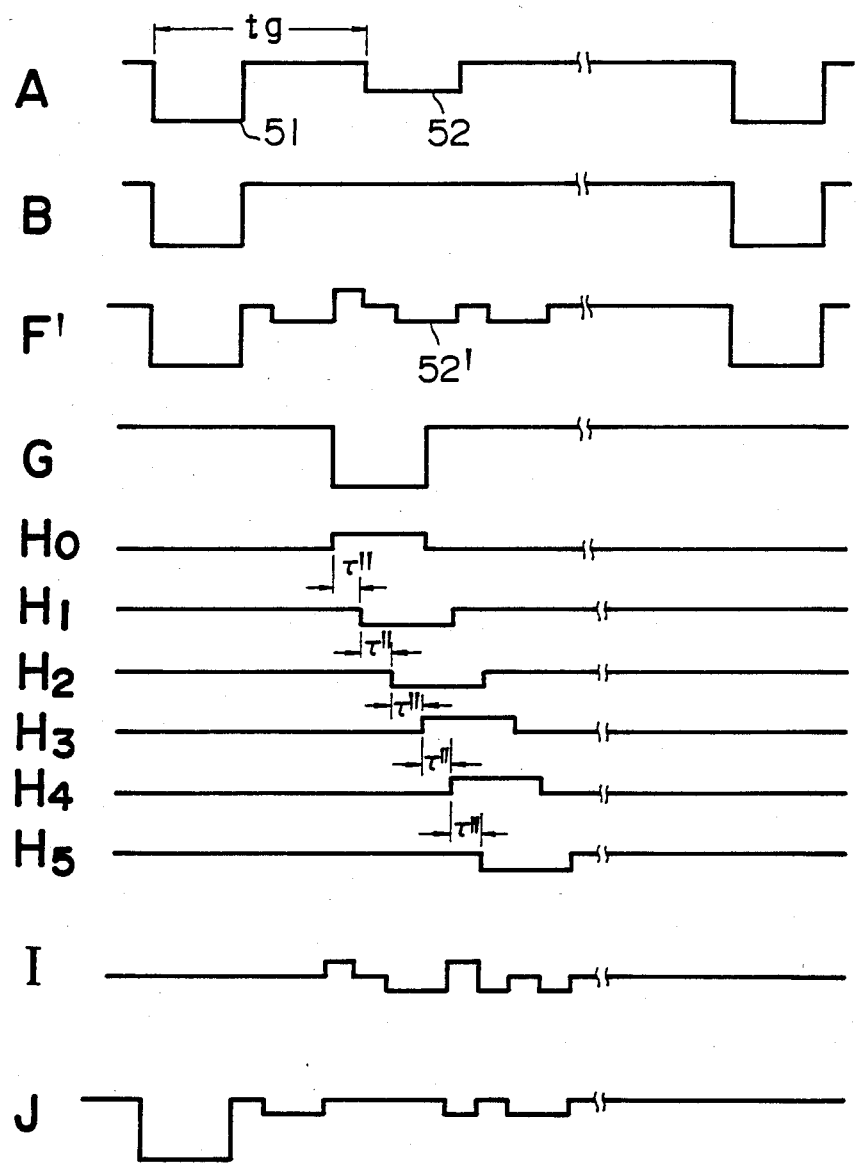
FIG. 5 shows a set of waveforms useful in explaining the operation of the ghost reduction circuit shown in FIG. 4.

In FIG. 5, A to J show waveforms at the respective portions in the circuit shown in FIG. 4. A and B are respectively a waveform of the video signal containing the ghost signal 52 at the input terminal 100 and a waveform of the reference signal generator 103. t$_g$ designates a time position or a delay time of the ghost signal.

F' is a waveform of the output signal from the first subtractor 106', that is, the signal obtained by subtracting the output signal of the first transversal filter 401 from the video signal with the waveform A. As previously stated, the waveform F' still contains a high frequency component 52' of the ghost signal. That is, the ghost signal is incompletely removed from the waveform F'.

G designates an output signal from the delay signal selection switch 403. One proper output signal is selected from those of the first set of delay elements 111' to 114' through the delay signal control selection switch 403 shown in FIG. 4, under control of the switch control circuit 402. The switch control circuit 402 selects a signal, which is formed by delaying the video input signal by a time approximate to the time position t$_g$ of the ghost signal, from the output signals of the delay elements of the first transversal filter 401.

The time position of the ghost signal can readily be known by detecting the output signal from each delay element which provides the maximum gain of each of the gain controllable circuits 221 to 224 in the first transversal filter 401, as previously stated.

H$_0$ to H$_5$ are output signals of the second gain controllable circuits 220, 221, ... , in the second transversal filter 404, when their gains b$_0$ to b$_5$ are:

b$_0$ = −¼
b$_1$ = ¼
b$_2$ = ¼
b$_3$ = −¼
b$_4$ = −¼
b$_5$ = ¼

I designates a waveform of an output signal from the second adder circuit 204, that is, the output signal from the second transversal filter 404, which is analogous to that of the high frequency component 52'. J designates an output signal from the second subtractor circuit 205. As seen from the waveform J, the amplitude of the ghost signal contained in the waveform J is sufficiently reduced compared to the ghost signal 52 in the waveform A.

The numbers of stages of the delay elements which form the first and second transversal filters according to the present invention will be compared with those of the prior art.

As described above, the delay time τ' of each of the first set of the delay elements 111' to 114' making up the first transversal filter is set at 250 nS, which is larger than that of the prior art. Let us consider a case of removing the ghost signal occurring at the time position of about ¼ in the television screen, as in the prior art. The number m of stages of the delay elements for the ghost signal removal is $$m = 10 \text{ } \mu S / 250 \text{ } nS = 40 \text{ stages.}$$

In the first transversal filter, the high frequency components of the ghost signal can not be removed. Accordingly, to remove the high frequency components of the ghost signals, the delay time τ' of each of the second set of delay elements 211 to 214 making up the second transversal filter 404 is set at 100 nS which is equal to that of the prior art.

In this case, the input signal to the second transversal filter 404 is a signal which is previously delayed by the delay element of the first transversal filter 401. Accordingly, the overall delay time of the first transversal filter 401 is (τ'×m), and the overall delay time of the second transversal filter is (τ''×n), and is about 1/10.

Consequently, the number n of stages of the delay elements making up the transversal filter 404 is $$n = 1 \text{ } \mu S / 100 \text{ } nS = 10 \text{ stages.}$$

Whereas the prior transversal filter needs 100 stages of the delay elements, only 50 stages of the delay elements, which is ½ the prior art one, are required for the transversal filter in the present invention. In this respect, the present invention is considerably economical, compared to the prior art.

In the embodiment shown in FIG. 4, of the first set of delay elements 111' to 114' of the first transversal filter 401, only one delay element is selected and is used as an input signal to the second transversal filter 404. Alternatively, output signals of the two or more delay elements selected from the first set of the delay elements 111' to 114' are selected and composed, and the composed one is applied to the second transversal filter. This approach further improves the ghost signal removal.

FIG. 6 shows a circuit diagram of the delay signal selecting switch 403. As described above, G designates a waveform of an output signal from the delay signal selection switch 403. Under control of the output signal from the switch control circuit 402 shown in FIG. 4, a proper signal is selected from those output signals from the first set of the delay elements 111' to 114' and appears at the output terminal of the delay selection switch 403. In the circuit, n field effect transistors (hereinafter referred to as FET) are so arranged, as shown in FIG. 6, that the gate electrodes of the FETs are connected to a plurality of output terminals of the switch control circuit 402, the drain electrodes are connected to a load resistor R$_L$, and the source electrodes are connected to the output terminals of the first set of the delay elements 111' to 114'. With this arrangement, only the output signal G of the FET which is turned on by the output signal from the switch control circuit 402 is applied as an input signal to the second set of the delay elements 211 to 214.

FIG. 7 shows a practical arrangement used for the first and second gain controllable circuits 121' to 124', and 220 to 224. In each of the gain controllable circuits, the internal resistances of the transistors (Q$_4$, Q$_5$; Q$_6$, Q$_7$) are changed by the output signal Vc from control voltage generating circuits (102', 201) for generating control signals in response to a difference signal between the television signal and the reference signal to change a gain of a differential amplifier made up of transistors $Q_2$ and $Q_3$. After the input signal $V_{in}$ is controlled by the control voltage $V_c$, it appears across the load resistor $R'_L$ as an output signal. The transistor $Q_1$ forms a constant current source.

When the control voltage $V_c$ exceeds the emitter potential of the transistors $Q_4$ to $Q_7$, the transistors $Q_5$ and $Q_6$ are conductive to produce an output signal voltage which is out of phase with respect to the input signal. On the other hand, when the control voltage is below the emitter potential of the transistors ($Q_4$ to $Q_7$), the transistors $Q_5$ and $Q_6$ are nonconductive to produce an output signal voltage which is in phase with respect to the input signal. Accordingly, the gain controllable circuits shown in FIG. 7 not only control the gain by the control voltage $V_c$ but also can make the phase inversion between the input and output signals. Thus, the gain controllable circuits can produce signals to offset the ghost signals in the television signal inputted. By selecting an optimum delay time of the second set of the delay elements, the ghost signal at 4.5 MHz or so as of the prior art may also be removed by the delay elements of which the number is half the prior one, in cooperation with the gain controllable circuit.

The above-mentioned embodiment of the present invention is of the called feed forward type which uses an input signal to the transversal filter as a reference signal. It is evident that the present invention is applicable for a feedback type which uses the output signal of the ghost reduction circuit.

The transversal filter may be fabricated into an integrated circuit by using the CTD (charge transfer device) technology. Also in this case, the chip area of the IC can be reduced when the present invention is used. In this respect, the present invention is superior to the prior art, from an economical view point.

What is claimed is:

1. A ghost reduction circuit arrangement for a television receiver comprising:
    (a) an input terminal to which a television signal containing ghost signal is applied;
    (b) a first set of delay elements of m each with a first delay time, which are connected in series, with the input terminal connecting to said input terminal;
    (c) a circuit for generating a reference signal on the basis of said television signal, said circuit being connected to said input terminal;
    (d) a first comparing circuit for comparing said television signal with said reference signal;
    (e) a first set of gain controllable circuits of m for controlling the amplitude and the polarity of the output signals of said delay elements, to which the output signals from said first set of delay elements are applied, respectively;
    (f) a gain control voltage generating circuit for controlling gains of said gain controllable circuits and their output signals, on the basis of the output signal from said first comparing circuit;
    (g) a first adder circuit for adding the output signals from said first set of gain controllable circuits;
    (h) a first subtractor circuit for subtracting an output signal of said first adder from said television signal supplied through said input terminal;
    (i) a second set of delay elements of n each with a second delay time connected in series;
    (j) a delay signal selection switch for selectively supplying the output signals of said first set of delay elements to the input terminal of said second set of delay elements;
    (k) a switch control circuit for controlling said delay signal selection switch on the basis of an output signal voltage from said gain control voltage generating circuit;
    (l) a second comparing circuit for comparing said reference signal with said first subtractor circuit;
    (m) a second set of gain controllable circuits of n for controlling the amplitudes and the polarity of the output signals from said second set of delay elements provided corresponding to said second set of delay elements;
    (n) a second control voltage generating circuit for supplying a signal voltage for controlling the gains and the polarity of said second set of gain controllable circuits to said second set of gain controllable circuits, on the basis of the output signal from said second comparing circuit;
    (o) a second adder circuit for adding the output signals of said second set of gain control circuits; and
    (p) a second subtracting for subtracting the output signal of said second adder circuit from the output signal from said first subtractor.

2. The ghost reduction circuit arrangement according to claim 1, wherein the delay time of said first set of delay elements is selected longer than the delay time of said second set of delay elements.

3. The ghost reduction circuit arrangement according to claim 1, wherein said delay signal selection switch has a plurality of delay signal input terminals, a plurality of control signal input terminals, and a single output terminal, and selectively produces said delay signal on the basis of said control signal, said delay signal selection switch being comprised of a plurality of FETs which are connected at the drain electrodes together to the output terminal, coupled at the source electrodes with delay signals, and coupled at the gate electrodes with a control voltage from said switch control circuit.

* * * * *